US008417455B2

(12) United States Patent
Zhong et al.

(10) Patent No.: US 8,417,455 B2
(45) Date of Patent: Apr. 9, 2013

(54) TRIAXIAL ANTENNA ELECTROMAGNETIC MEASUREMENTS

(75) Inventors: Lili Zhong, Missouri City, TX (US); Qiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 264 days.

(21) Appl. No.: 12/975,664

(22) Filed: Dec. 22, 2010

(65) Prior Publication Data

US 2012/0166086 A1 Jun. 28, 2012

(51) Int. Cl.
*G01V 1/40* (2006.01)
*G01V 3/00* (2006.01)

(52) U.S. Cl.
USPC .............................................. 702/7; 324/338

(58) Field of Classification Search .................. 702/7, 6, 702/9, 11, 77, 85; 324/338; 343/703, 719
See application file for complete search history.

(56) References Cited

U.S. PATENT DOCUMENTS

| 4,899,112 | A | 2/1990 | Clark et al. |
| 6,326,784 | B1* | 12/2001 | Ganesan et al. ............... 324/303 |
| 2003/0200029 | A1* | 10/2003 | Omeragic et al. ................ 702/6 |
| 2008/0136419 | A1* | 6/2008 | Seydoux et al. .............. 324/333 |

* cited by examiner

*Primary Examiner* — Michael Nghiem
*Assistant Examiner* — Manuel Rivera Vargas
(74) *Attorney, Agent, or Firm* — Kenneth Liu; Darla Fonseca (57) ABSTRACT

The present disclosure relates to a method to determine a formation property of a subsurface formation. A downhole logging tool having two or more antennas, at least one of the antennas being a non-co-located triaxial antenna, is provided. Azimuthally sensitive measurements are obtained using the antennas of the downhole logging tool. The measurements are fitted to a Fourier series having Fourier coefficients and the non-co-location of the triaxial antenna is compensated for by adjusting the Fourier coefficients. Compensated measurements are determined using the adjusted Fourier coefficients and the formation property of the subsurface formation is determined using the compensated measurements. The compensating may use one or more scale factors that depend on an amplitude, phase, and/or frequency of the received signal, and an alignment angle between the triaxial antenna and another of the antennas of the logging tool.

20 Claims, 10 Drawing Sheets

TRIAXIAL ANTENNA ELECTROMAGNETIC MEASUREMENTS

CROSS-REFERENCE TO OTHER APPLICATIONS

N/A

BACKGROUND

1. Technical Field

The present disclosure relates generally to the logging of subsurface formations surrounding a wellbore using a downhole logging tool, and particularly to improving the measurement quality of the logging tool by accounting for the distribution of antennas within the antenna array.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling.

In one manner of making deep LWD electromagnetic measurements, triaxial antennas carried on a transmitter sub are used in conjunction with a directional receiver (carried on a receiver sub). The relative azimuthal angle between the sub containing the transmitters and the sub containing the receiver usually cannot be controlled when the two subs are made up. Thus, the azimuthal offset between the transmitter and receiver antennas is not normally known. Also, due to technical limitations, the triaxial antennas are not co-located. Such is the current design for tools used in the LWD environment to make deep directional electromagnetic measurements for well placement and electromagnetic look-ahead applications.

SUMMARY

The present disclosure relates to a method to determine a formation property of a subsurface formation. A downhole logging tool having two or more antennas, at least one of the antennas being a non-co-located triaxial antenna, is provided. Azimuthally sensitive measurements are obtained using the antennas of the downhole logging tool. The measurements are fitted to a Fourier series having Fourier coefficients and the non-co-location of the triaxial antenna is compensated for by adjusting the Fourier coefficients. Compensated measurements are determined using the adjusted Fourier coefficients and the formation property of the subsurface formation is determined using the compensated measurements. The compensating may use one or more scale factors that depend on an amplitude, phase, and/or frequency of the received signal, and an alignment angle between the triaxial antenna and another of the antennas of the logging tool.

Other aspects and advantages will become apparent from the following description and the attached claims.

DETAILED DESCRIPTION

Some embodiments will now be described with reference to the figures Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
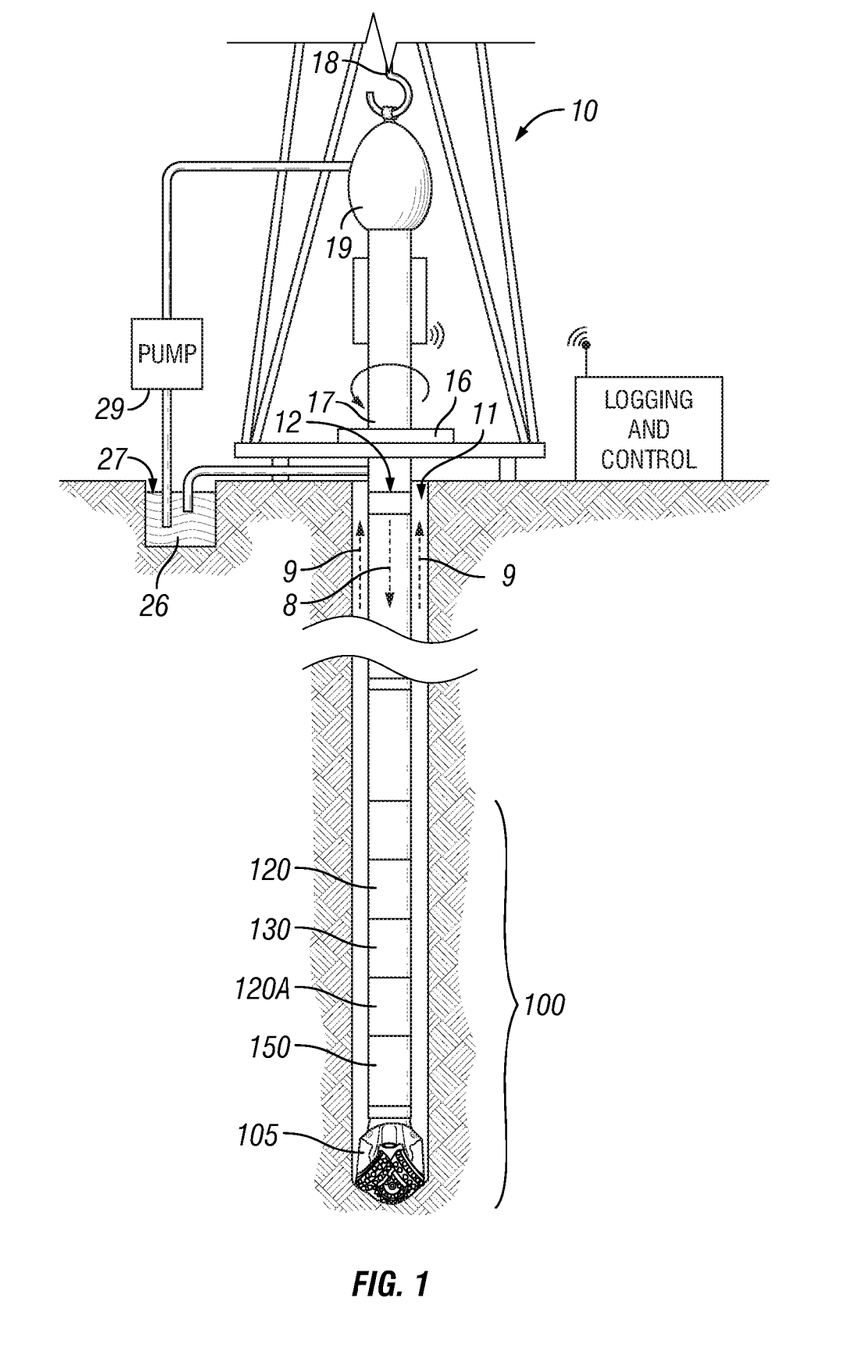
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
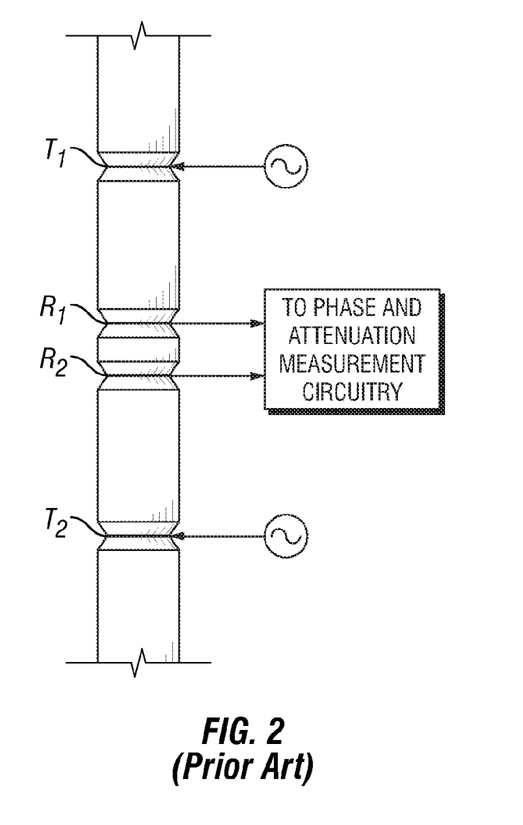
FIG. 2 shows a prior art electromagnetic logging tool.

An example of a tool which can be the LWD tool 120, or can be a part of an LWD tool suite 120A, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually independent. That is, the dipole moment of any one of the antennas does not lie in the plane formed by the dipole moments of the other two antennas. Three orthogonal antennas, with one antenna axial and the other two transverse, is one example of a triaxial antenna. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Figure 3A:
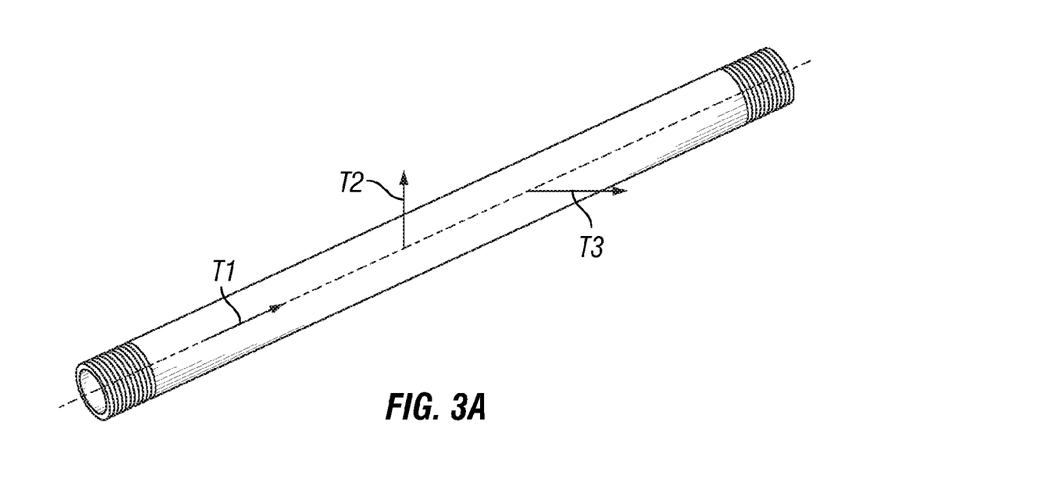
FIG. 3A schematically shows a transmitter sub of an exemplary resistivity logging tool having triaxial transmitters T1, T2, and T3.
Figure 3B:
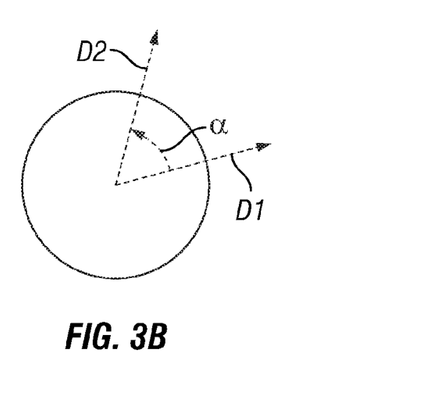
FIG. 3B is an axial view of a hypothetical electromagnetic logging tool having a magnetic dipole D1 representing a transmitter antenna on a transmitter sub and a magnetic dipole D2 representing a receiver antenna on a receiver sub.
Figure 4A:
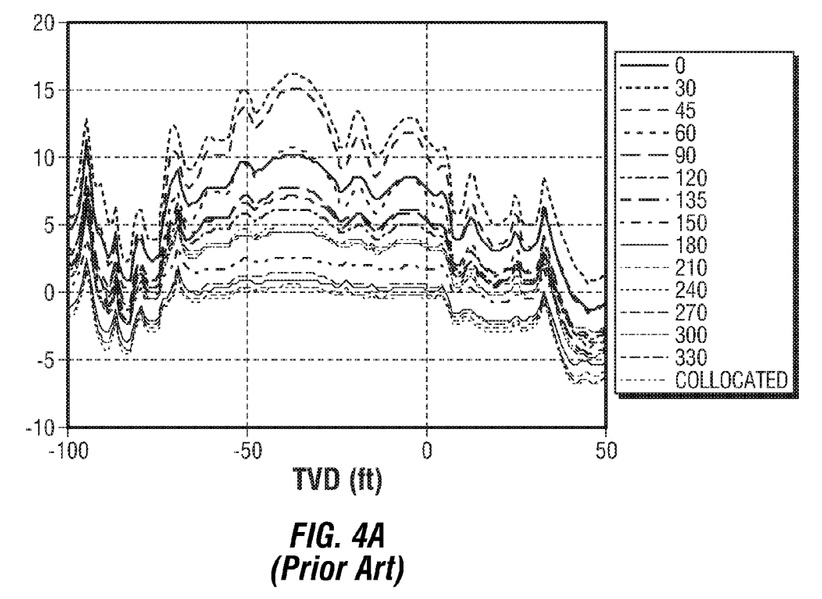
FIG. 4A is a plot of the harmonic resistivity amplitude versus the true vertical depth, as determined using a prior art method.
Figure 4B:
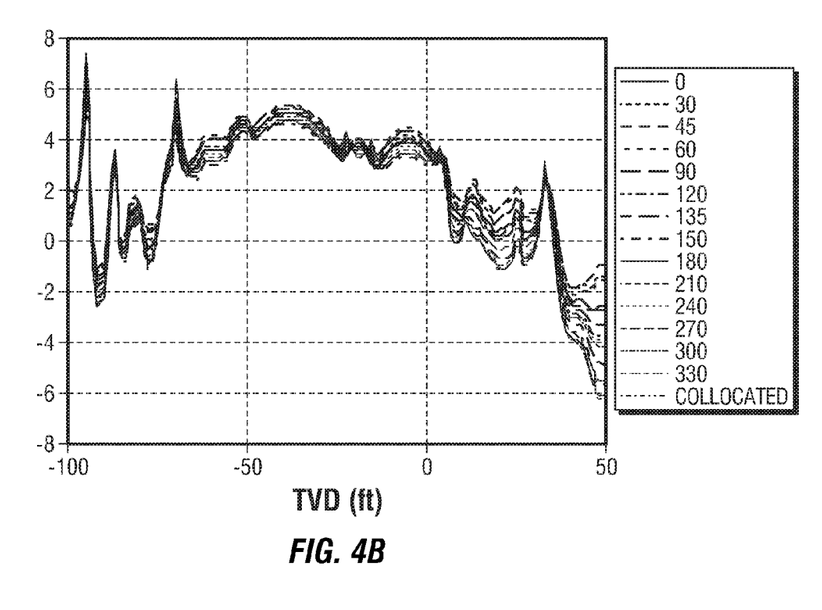
FIG. 4B is a plot of the harmonic resistivity amplitude versus the true vertical depth, as determined using an embodiment in accordance with the present disclosure.
Figure 5A:
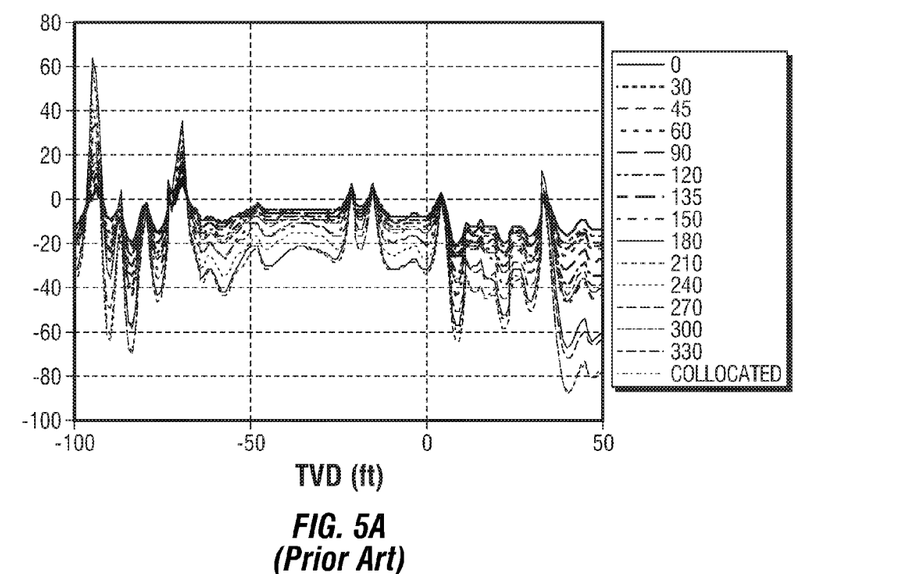
FIG. 5A is a plot of the harmonic resistivity phase versus the true vertical depth, as determined using a prior art method.
Figure 5B:
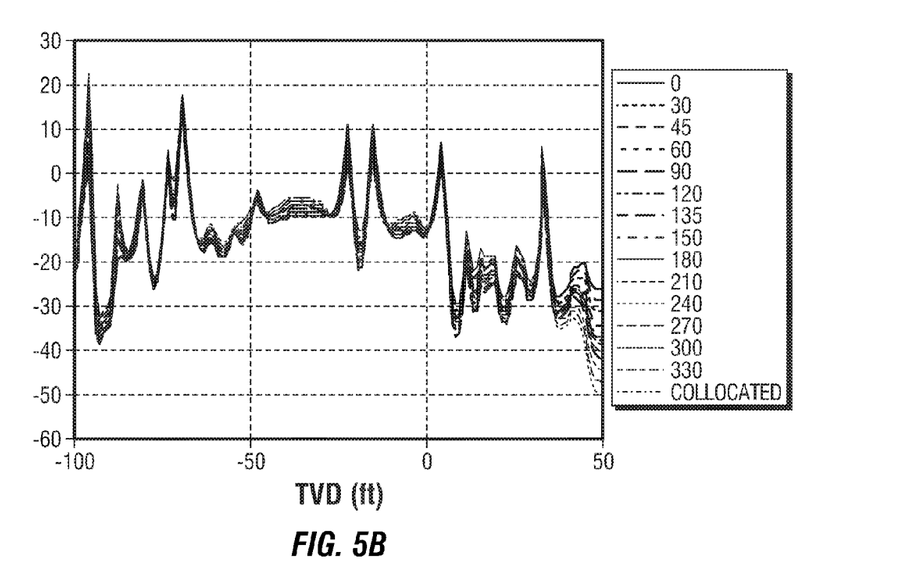
FIG. 5B is a plot of the harmonic resistivity phase versus the true vertical depth, as determined using an embodiment in accordance with the present disclosure.

Resistivity logging tools having certain combinations of tilted antennas can be used to obtain logs of the resistivity in anisotropic formations. For ease of discussion, a transmitter sub of an exemplary resistivity logging tool is shown in FIG. 3A, which shows the triaxial transmitters T1, T2, and T3. In a prior art data processing method, the three transmitter antennas are treated as if they are located at the same physical location ("co-located") in the tool. In actuality, each antenna is located some distance apart from any neighboring adjacent antenna. Neglecting non-co-location of the transmitter antennas has led to significant dependence of the measurements on the transmitter-receiver sub alignment angle. By "alignment angle", we mean the azimuthal offset between magnetic moment vectors. FIG. 3B is an axial view of a hypothetical electromagnetic logging tool having a magnetic dipole D1 representing a transmitter antenna on a transmitter sub and a magnetic dipole D2 representing a receiver antenna on a receiver sub. The angle $\alpha$ is the alignment angle. In other words, the measurement value will change if the same formation interval is logged a second time with exactly the same bottomhole assembly configuration, but with different tools having a different alignment angle due, for example, to thread differences. It is desirable that the measurements obtained from the tool be a function of the earth formation properties only and not depend on the particular way the transmitter and the receiver are aligned with one another.

Although triaxial transmitters and a single receiver are used in the discussion below for convenience and to facilitate the use of field test data, this distinction is of no significance to the implementation of the disclosed method. In other words, the method disclosed herein applies equally well to other architectures that use, for example, a single transmitter antenna and triaxial receiver antennas. The method is preferably used with while-drilling tools, but can also apply to wireline tools having directional sensitivity such as those with a plurality of triaxial antennas. In addition, the method applies to horizontal well landing/steering applications as well as to electromagnetic look-ahead applications in both low and high angle wells.

Measurements from non-co-located antennas can be adjusted or compensated so as to appear as though the antennas are co-located. The resultant measurements, which may be used for interpretation, will then be a function of the physical properties of the earth, the measurement spacing, and the frequency, but not the alignment angle of the transmitter and receiver subs. Those compensated measurements improve the consistency and quality of interpretation. The primary source of information for interpreting the subsurface earth model are the deep resistivity channels, the symmetrized and anti-symmetrized directional measurements, and the harmonic resistivity and anisotropy measurements.

To obtain compensated measurements, we begin by recording the received signal and tool angle while the tool is rotating. That data is used to extract five Fourier coefficients. This is done, for example, using a Recursive Least Square (RLS) Fitting Algorithm. After the non-co-located Fourier coefficients are determined, they are adjusted to the values of co-located Fourier coefficients. The compensated measurements are then constructed using the adjusted Fourier coefficients.

Stated differently, to compensate for the non-co-location of the triaxial antennas, one can transform the measurements from the three antennas of slightly different spacings to measurements the antennas would have obtained if they were in fact co-located. We preferably choose the location of the middle antenna as a reference location. A measurement constructed in this manner shows more consistency between different frequencies and spacings. It also makes all the harmonic resistivity measurements more amenable to being transformed into apparent resistivities. We can build a transform table for a fixed spacing and frequency to obtain the formation property from the harmonic resistivity measurements. Various embodiments, each at a different level of complexity, may be used to obtain the desired compensation.

In one embodiment, the raw amplitude of the voltage signal is scaled by the cube of the transmitter-receiver distance. A simple geometric scaling of coefficients by a simple dependence of $1/L^3$ may be performed, where L is the distance between the transmitter antenna and the receiver antenna. This is how the strength of the dipole field decreases in air. Thus, we expect that with this scaling, the response of the tool should be improved, at least in resistive formations. The coefficients from the fittings for the three transmitters are scaled so that they correspond to measurements at the same location and the scaled measurements are then used in subsequent processing.

FIGS. 4A-7B show different plots for the geometric scaling. The "A" panels (i.e., FIGS. 4A, 5A, 6A, and 7A) are plots of responses from a prior art processing method for an anisotropic model for a series of alignment angles from 0 to 330 degrees for a given transmitter-receiver sub distance. The prior art processing generates measurements that are quite sensitive to the alignment angles, as indicated by the curve separations. The "B" panels (i.e., FIGS. 4B, 5B, 6B, and 7B) are plots of responses from the same raw measurements after geometric scaling is applied to the amplitude of the voltage signal. After scaling is applied, the separations become much smaller. The improvement is quite dramatic for the harmonic resistivity amplitude and harmonic resistivity phase measurement channels.

Figure 6A:
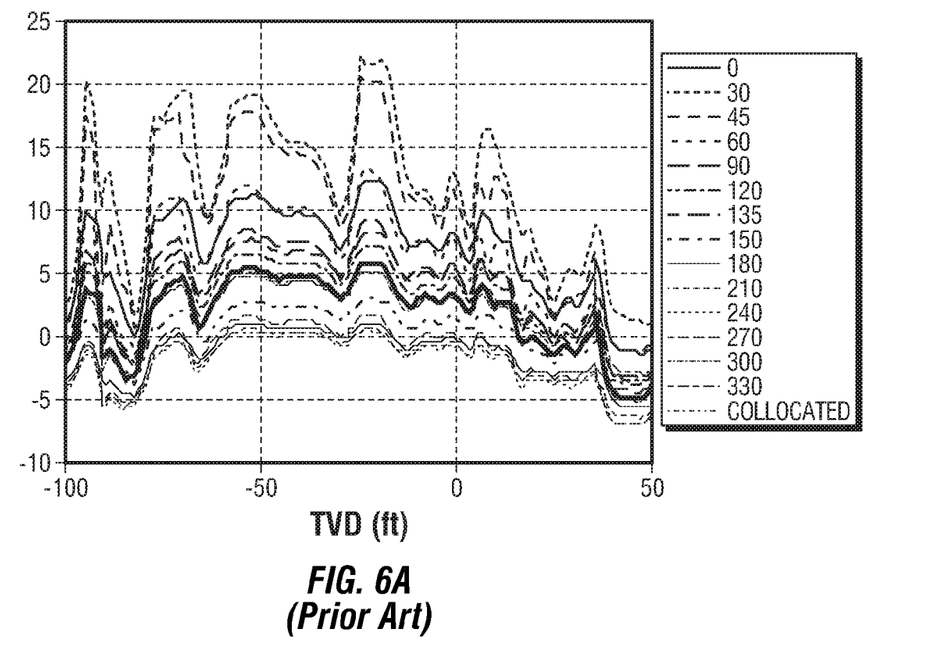
FIG. 6A is a plot of the harmonic resistivity amplitude versus the true vertical depth, as determined using a prior art method.
Figure 6B:
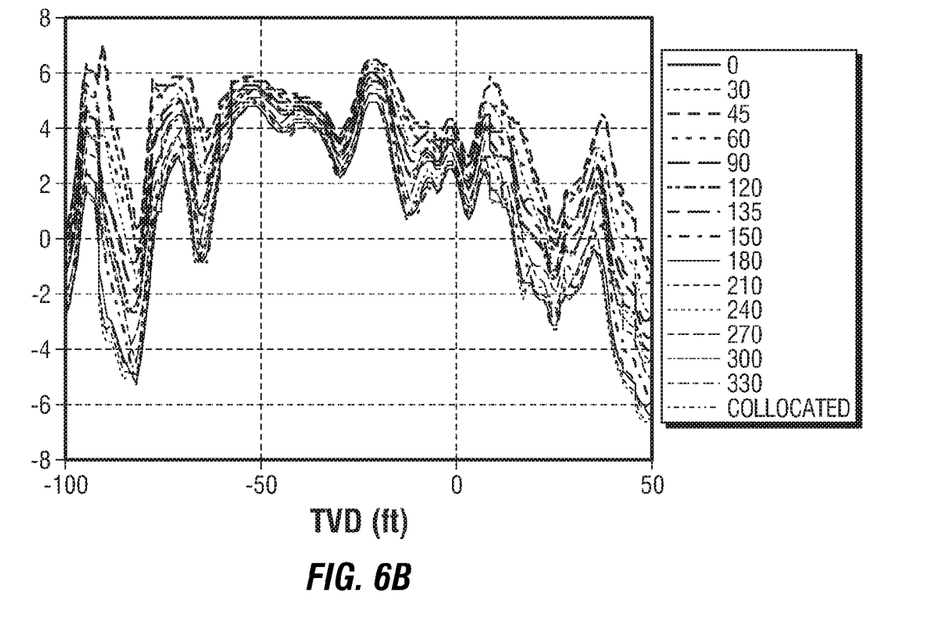
FIG. 6B is a plot of the harmonic resistivity amplitude versus the true vertical depth, as determined using an embodiment in accordance with the present disclosure.
Figure 7A:
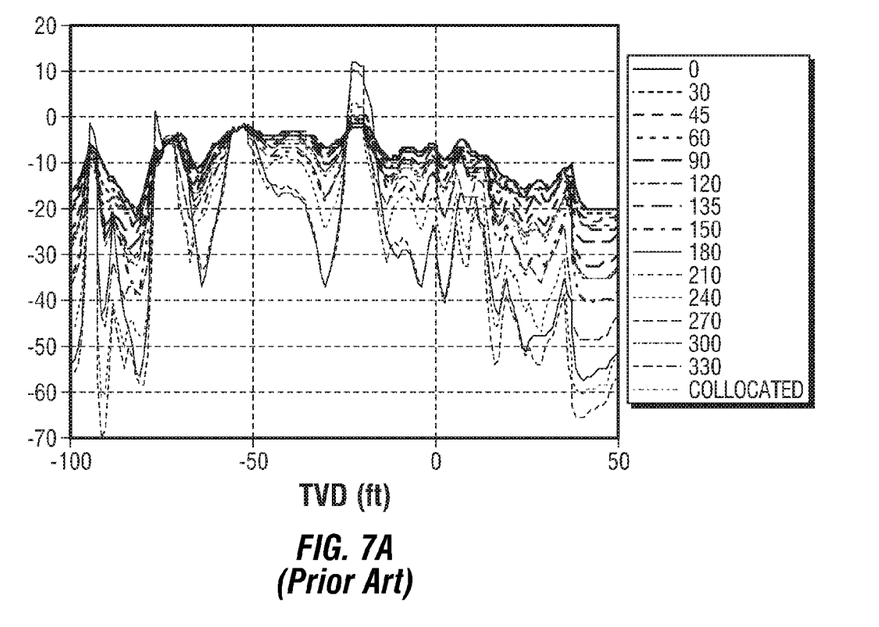
FIG. 7A is a plot of the harmonic resistivity phase versus the true vertical depth, as determined using a prior art method.
Figure 7B:
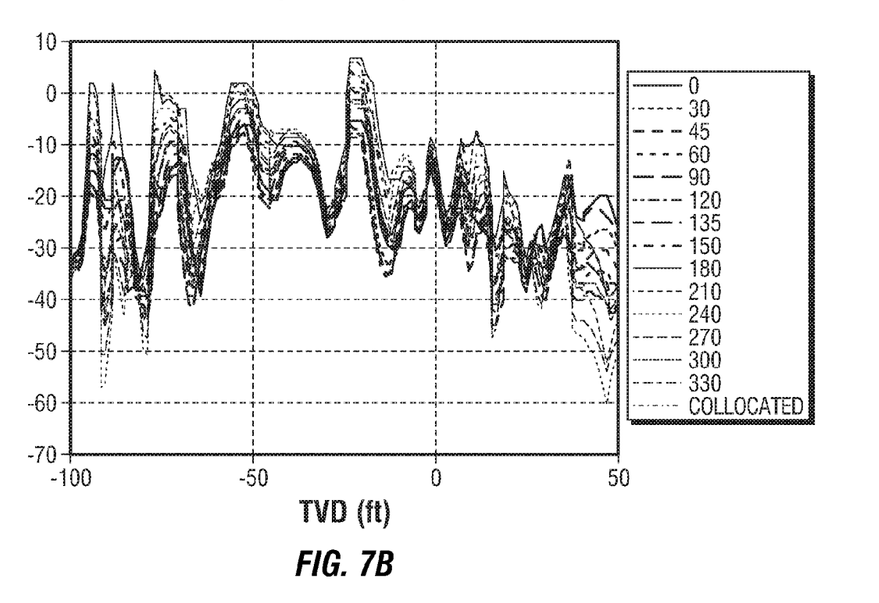
FIG. 7B is a plot of the harmonic resistivity phase versus the true vertical depth, as determined using an embodiment in accordance with the present disclosure.

Although the simple scaling works well for resistive formations, there are still significant discrepancies between the channels for different alignment angles, as can be seen in the harmonic resistivity amplitude plot for the horizontal well (e.g., FIG. 4B, near the end of the log) and also in FIG. 6B for the near vertical (i.e., 10 degree dip) well. The rather large dependency of the harmonic resistivity phase measurements on alignment angle can also be seen in FIG. 7B. Thus, a simple geometrical scaling based on actual transmitter/receiver distance can improve the measurements in resistive formations and at low frequencies, but not in all anticipated formations.

The scaling of the complex amplitude, in principle, should depend on the formation resistivity. For the scaling to work in all resistivity ranges, it is preferable to apply a pre-computed transform with frequency, spacing, and alignment angle as input parameters. In an alternate, more complex embodiment, the raw amplitude of the voltage signal is scaled by a factor depending on the amplitude itself, the signal frequency (e.g., 500 Hz to 4 MHz), and the alignment angle. The dependence on alignment angle is directly related to the three transmitter antennas not being co-located. Thus, we wish to construct a transform that can provide equivalent measured coefficient values at the T1-R spacing for both T2 and T3. This can be achieved by directly calculating, for each frequency and alignment angle, the (non-azimuthal) zeroth order coefficients for T1-R (or T3-R) at the actual distance and also at the reference distance (measured at T1). As an example, the transform is computed in a homogeneous formation from 0.2 ohm-m to 1000 ohm-m. The ratio of the two voltages is the scaling factor to be applied (i.e., the transform) to the zeroth order coefficient (DC term) from the tool measurements, once an effective resistivity is identified. The effective resistivity is obtained by interpolating the transform table. The transform curve for one antenna spacing and frequency contains 30 DC amplitude corresponding formation values ranging from 0.2 ohm-m to 1000 ohm-m for each frequency.

Figure 8A:
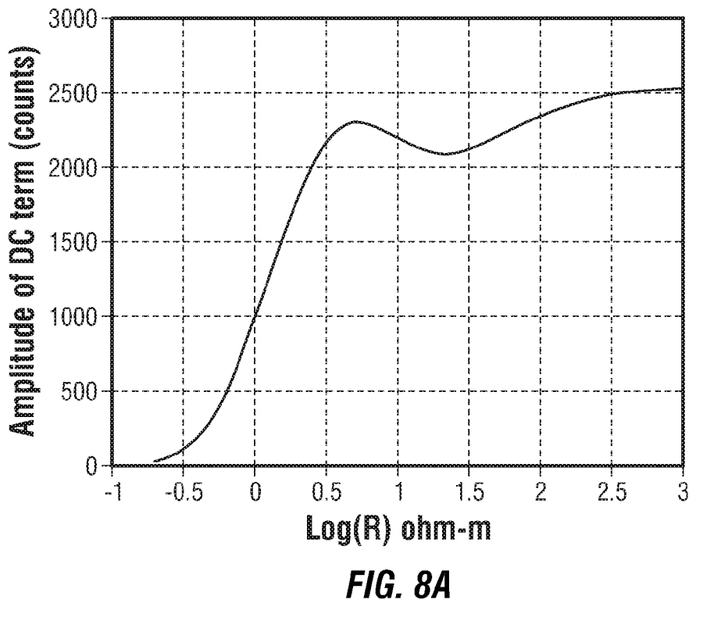
FIGS. 8A and 8B are plots of the amplitude (in counts) and angle (in degrees), respectively, of a DC term versus the log of the resistivity, in accordance with the present disclosure.
Figure 8B:
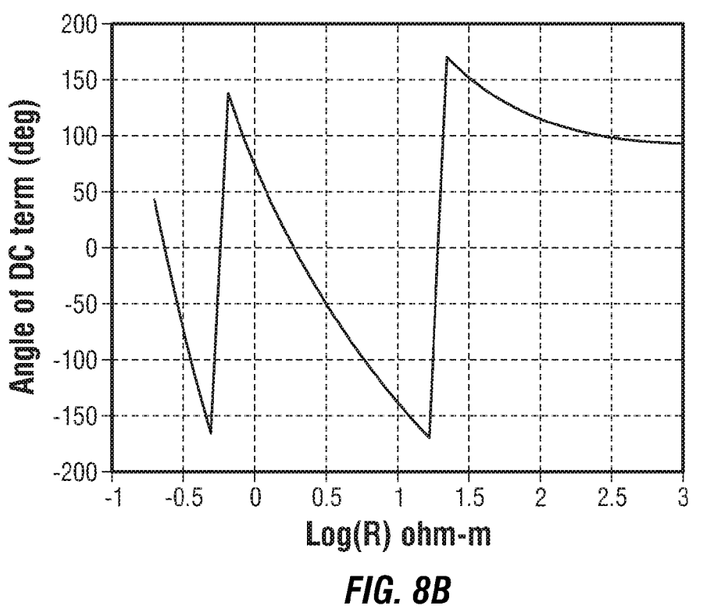

The amplitude of the DC term only is preferably used to build the transform table because, as FIG. 8B shows, the curve of the angle of the DC term is more complicated than the amplitude (see FIG. 8A) of the DC term. Getting the correct angle for the DC term would be more complicated. Using the amplitude of the DC term only is simpler and more efficient to apply downhole. However, though more complicated, it is possible to improve the transform further by using both the amplitude and the phase information, as described below.

Since non-co-location has more effect on the harmonic resistivity amplitude and harmonic resistivity phase measurements than other measurements, and also considering downhole processing time and memory constraints, it is preferable to only correct the DC term of the Fourier coefficients. To save downhole memory space, the transform is parameterized and only the parameters are saved in a look-up table. For downhole applications, an analytical formulation can be used to compute the homogeneous formation responses to save computation time.

Figure 9:
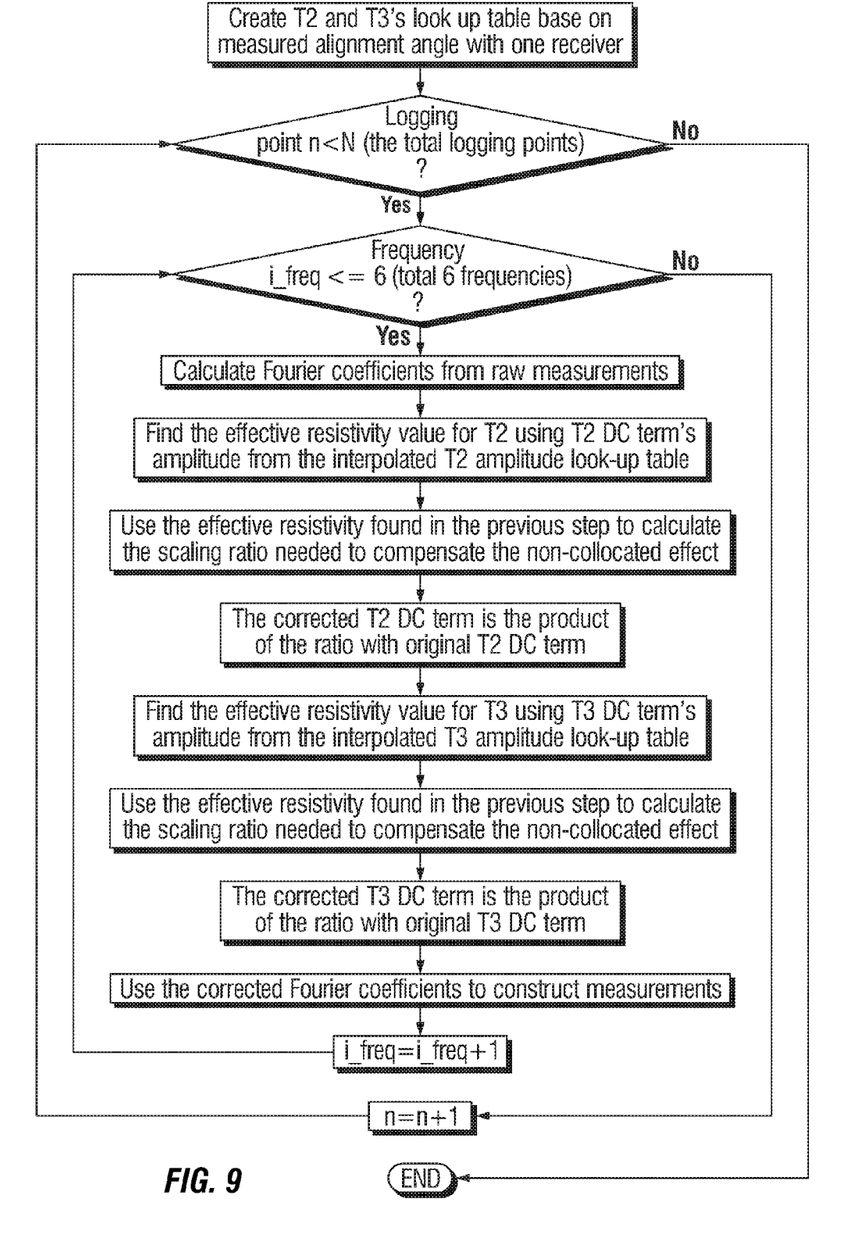
FIG. 9 is a flowchart showing the steps of one embodiment, in accordance with the present disclosure.

The detailed processing is shown in the flowchart of FIG. 9. For each log point, we first calculate the non-co-located Fourier coefficients using, for example, a Recursive Least Square (RLS) Fitting Algorithm, for each transmitter antenna and frequency from 2 kHz to 96 kHz. Next we find an effective resistivity for T2 for each frequency from a pre-built table for T2 using its DC term. This effective resistivity value is used to find the scaling factor. In the end, the corrected T2's DC term value will be the product of the non-co-located T2's DC term and the scaling factor. Similar steps apply for T3's DC term. Once this is done, we can use the corrected Fourier coefficients to construct the measurement channels.

In this process, the most difficult task is to find the correct effective resistivity value for each frequency, spacing, and alignment angle because the transform is not monotonic for certain combinations of spacing, frequency, and alignment angle. This mean it is possible to have more than one solution of 'effective' resistivity. When the interpolation result is not unique, one must to choose which one to use for the subsequent calculations. When multiple solutions for resistivity exist, we preferably choose the solution with the highest resistivity. However, if this resistivity is less than the effective resistivity values selected for lower frequencies, it is preferable to instead use the values from the lower frequencies for the calculations since transforms from the lower frequency measurements tend to be more monotonic for the same fixed spacings.

Figure 10:
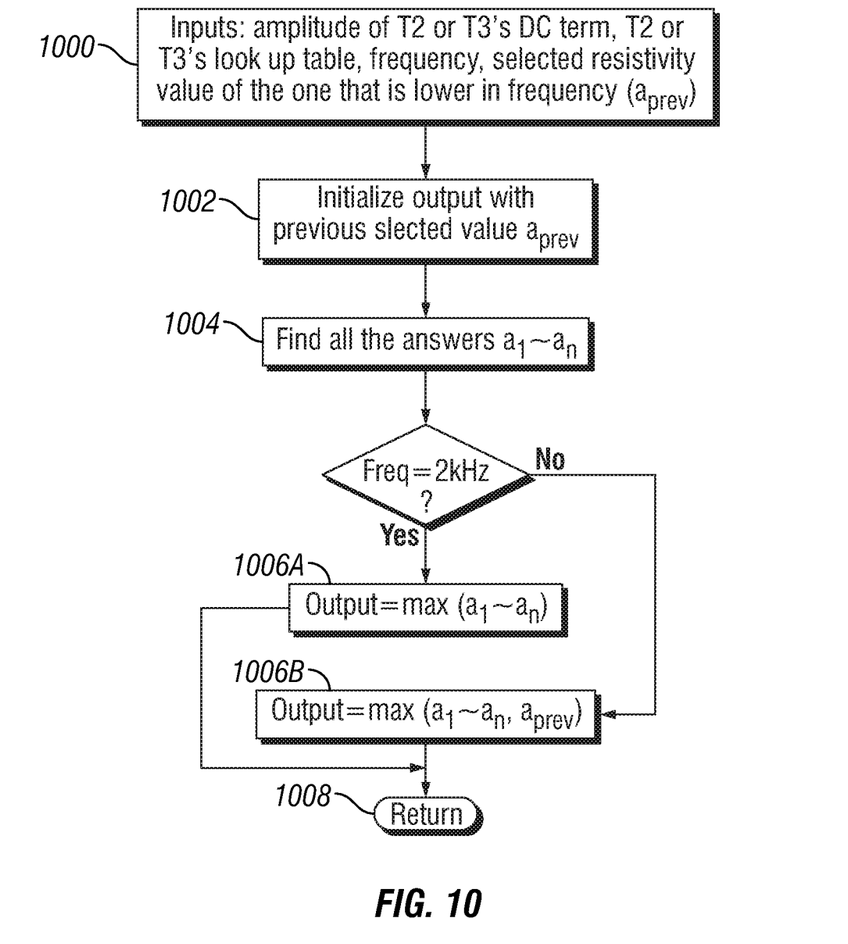
FIG. 10 is a flowchart showing the steps of one embodiment to obtain the selected resistivity value, in accordance with the present disclosure.

FIG. 10 is a flow chart showing how to obtain the DC term's corresponding homogeneous resistivity value. The inputs include the amplitude of the T2's (or T3's) DC term, T2's (or T3's) look up table, the signal frequency, and the selected resistivity value for the next lowest frequency in the previous step, $a_{prev}$ (step 1000). The output is initialized with the previous selected value $a_{prev}$ (step 1002). All "n" possible answers $a_1 \sim a_n$ are determined (step 1004). If the signal frequency is 2 kHz, then the maximum value of the $(a_1 \sim a_n)$ answers is output (step 1006A). If the signal frequency is not 2 kHz, then the maximum value of the $(a_1 \sim a_n, a_{prev})$ answers is output (step 1006B). The output is then returned for further processing (step 1008).

The above-described processing significantly reduces the measurements' dependency on alignment angle, not only for horizontal wells but also for near vertical wells. Better results are obtained for harmonic resistivity amplitude measurements than for harmonic resistivity phase measurements. For horizontal wells, the improvement over the existing processing is significant. However, in vertical wells, there are still zones in which the results are not as effective. In zones with significant resistivity anisotropy, the above-described embodiments improve, but do not fully remove the alignment angle dependence. Further improvement may be achieved by using both the amplitude and phase information from the zeroth order coefficient to find the effective horizontal resistivity, the effective vertical resistivity, and the relative dip angle. In a further embodiment, the voltage signal is scaled by a factor depending on the amplitude and phase of the raw voltages, the signal frequency, and the alignment angle. This can, in principle, be done with multiple measurements using multiple frequencies. The use of phase information assumes that the system can provide a direct phase measurement with a desirable accuracy.

Figure 11:
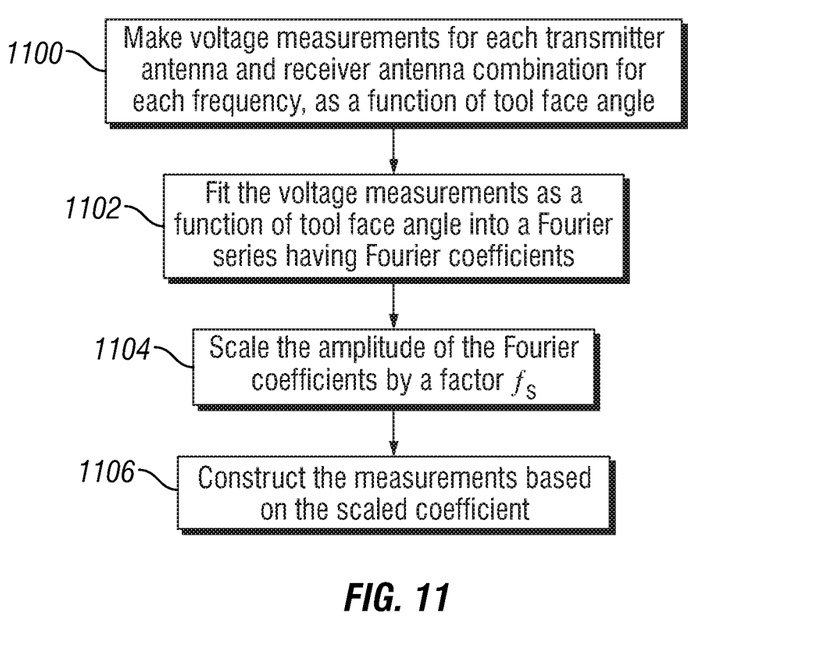
FIG. 11 is a flowchart showing the steps of one embodiment, in accordance with the present disclosure.

To reiterate, the disclosed method may involve some of the following steps, as shown in FIG. 11. Make voltage measurements for each transmitter antenna and receiver antenna combination for each frequency, as a function of tool face angle (step 1100). Fit the voltage measurements as a function of tool face angle into a Fourier series having Fourier coefficients (step 1102). Scale the amplitude of the Fourier coefficients by a factor $f_s$, where $f_s$ may be a function of one or more of the measurement frequency f, the distance L from transmitter antenna to receiver antenna, the alignment angle between the transmitter sub and receiver sub, and the amplitude of the zeroth order coefficient itself (step 1104). Construct the measurements based on the scaled coefficients (step 1106). The same or similar steps are used in the interpretation product.

Different manners of scaling include geometric scaling or scaling by a function F that is constructed in advance based on certain processing techniques to be used during measurement construction. For geometric scaling, $f_s=(L/L_m)^3$, where $L_m$ is the distance from the middle antenna of the transmitter sub to the receiver antenna, and L is the distance from a particular antenna of the transmitter sub to the receiver antenna. In one embodiment, $f_s=F(f, L, |A_0|, \phi)$, where $|A_0|$, is the amplitude of the zeroth order coefficient for that transmitter and antenna combination using the amplitude only, and $\phi$ is the alignment angle. In an alternate embodiment, $f_s=F(f, L, A_0, \phi)$, where $A_0$ is the zeroth order complex coefficient for that transmitter and antenna combination using both the amplitude and the phase.

For a real time process, the look-up table preferably has information of alignment angle, spacing, frequencies (sometimes not all available frequencies are used), transmitter current, and receiver gain. Also, to use the computed transforms properly, gains from both the antennas and the electronics should be taken into account.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine a formation property of a subsurface formation, comprising:
    providing a downhole logging tool having two or more antennas, at least one of the antennas being a non-co-located triaxial antenna;
    obtaining azimuthally sensitive measurements using the antennas of the downhole logging tool;
    fitting the measurements to a Fourier series having Fourier coefficients to form a fitted signal;
    removing gains from the fitted signal;
    compensating for the non-co-location of the triaxial antenna by adjusting the Fourier coefficients of the un-gained fitted signal;
    determining compensated measurements using the adjusted Fourier coefficients; and
    determining the formation property of the subsurface formation using the compensated measurements.

2. The method of claim 1, wherein the compensating for the non-co-location of the triaxial antenna comprises determining an effective resistivity for each non-centered antenna in the triaxial antenna for each frequency transmitted or received by that non-centered antenna.

3. The method of claim 2, further comprising using the determined effective resistivities to determine one or more scale factors.

4. The method of claim 3, further comprising using the one or more determined scale factors to adjust the Fourier coefficients.

5. The method of claim 1, wherein the obtaining azimuthally sensitive measurements comprises transmitting and receiving an electromagnetic signal transmitted at a certain frequency, or transmitting and receiving a plurality of electromagnetic signals, each of the electromagnetic signals being transmitted at different frequencies.

6. The method of claim 5, wherein any particular electromagnetic signal has a frequency in the range of 500 hertz to 4 megahertz, inclusive.

7. The method of claim 1, wherein the compensating for the non-co-location of the triaxial antenna comprises using one or more scale factors that depend on an amplitude of a received signal, a frequency of the received signal, and an alignment angle between the triaxial antenna and another of the antennas of the logging tool.

8. The method of claim 7, wherein the compensating further comprises determining, for each frequency and alignment angle, a zeroth order coefficient for each transmitter-receiver pair at an actual distance and at a reference distance.

9. The method of claim 1, wherein the providing comprises disposing the downhole logging tool on a wireline, a drill string, or a wired drill pipe.

10. The method of claim 1, wherein the adjusting comprises adjusting the DC term of the Fourier coefficients only.

11. The method of claim 1, wherein the compensating comprises determining a plurality of effective resistivities and using the effective resistivity having the highest determined value.

12. The method of claim 1, wherein the compensating for the non-co-location of the triaxial antenna comprises using one or more scale factors that depend on an amplitude and a phase of a received signal, a frequency of the received signal, and an alignment angle between the triaxial antenna and another of the antennas of the logging tool.

13. A system to determine a formation property of a subsurface formation, comprising:
a downhole logging tool having two or more antennas, at least one of the antennas being a non-co-located triaxial antenna; and
a processor configured for:
fitting azimuthally sensitive measurements obtained by the downhole logging tool to a Fourier series having Fourier coefficients to form a fitted signal;
removing gains from the fitted signal;
compensating for the non-co-location of the triaxial antenna by adjusting the Fourier coefficients;
determining compensated measurements using the adjusted Fourier coefficients; and
determining the formation property of the subsurface formation using the compensated measurements.

14. The system of claim 13, wherein the compensating for the non-co-location of the triaxial antenna comprises determining an effective resistivity for each non-centered antenna in the triaxial antenna for each frequency transmitted or received by that non-centered antenna.

15. The system of claim 14, further comprising using the determined effective resistivities to determine one or more scale factors, and using the one or more determined scale factors to adjust the Fourier coefficients.

16. The system of claim 13, wherein the downhole logging tool is disposed on a wireline, a drill string, or a wired drill pipe.

17. The system of claim 13, wherein the compensating for the non-co-location of the triaxial antenna comprises using one or more scale factors that depend on an amplitude of a received signal, a frequency of the received signal, and an alignment angle between the triaxial antenna and another of the antennas of the logging tool.

18. The system of claim 13, wherein the compensating for the non-co-location of the triaxial antenna comprises using one or more scale factors that depend on an amplitude and a phase of a received signal, a frequency of the received signal, and an alignment angle between the triaxial antenna and another of the antennas of the logging tool.

19. A system having a non-transitory computer-readable medium having a set of computer-readable instructions encoded thereon that, when executed, perform acts comprising:
obtaining azimuthally sensitive measurements using a non-co-located triaxial antenna of a downhole logging tool;
removing gains from the measurements;
fitting the un-gained measurements to a Fourier series;
compensating for the non-co-location of the triaxial antenna by adjusting the coefficients of the Fourier series;
determining compensated measurements using the adjusted Fourier coefficients; and
determining the formation property of the subsurface formation using the compensated measurements.

20. The system of claim 19, wherein the downhole logging tool is a while-drilling logging tool.

* * * * *